United States Patent [19]

Warren

[11] 4,263,625
[45] Apr. 21, 1981

[54] HEADWHEEL SERVO LOCK VERIFICATION WITH STATIONARY HEAD

[75] Inventor: Henry R. Warren, Belle Mead, N.J.

[73] Assignee: RCA Corporation, New York, N.Y.

[21] Appl. No.: 86,329

[22] Filed: Oct. 19, 1979

[51] Int. Cl.³ .................. H04N 5/78; G11B 27/36; G11B 27/22
[52] U.S. Cl. .................................... 360/31; 360/75; 360/70
[58] Field of Search ................ 360/70, 31, 75

[56] References Cited

U.S. PATENT DOCUMENTS

| 3,225,135 | 12/1965 | Osawa | 360/31 |
| 3,369,082 | 2/1968 | Hibbard | 360/31 |
| 3,404,223 | 10/1968 | Violette | 360/31 |
| 3,549,797 | 12/1970 | Dann | 360/73 |
| 4,014,040 | 3/1977 | Kornhaas | 360/70 |

Primary Examiner—Bernard Konick
Assistant Examiner—Alan Faber
Attorney, Agent, or Firm—Eugene M. Whitacre; Paul J. Rasmussen; William H. Meise

[57] ABSTRACT

In a helical-scan tape recorder, headwheel servo loop locking is verified by a stationary head located downstream from the headwheel at a transverse position relative to the tape path at which the vertical synchronizing or blanking signals occur in normal operation.

6 Claims, 6 Drawing Figures

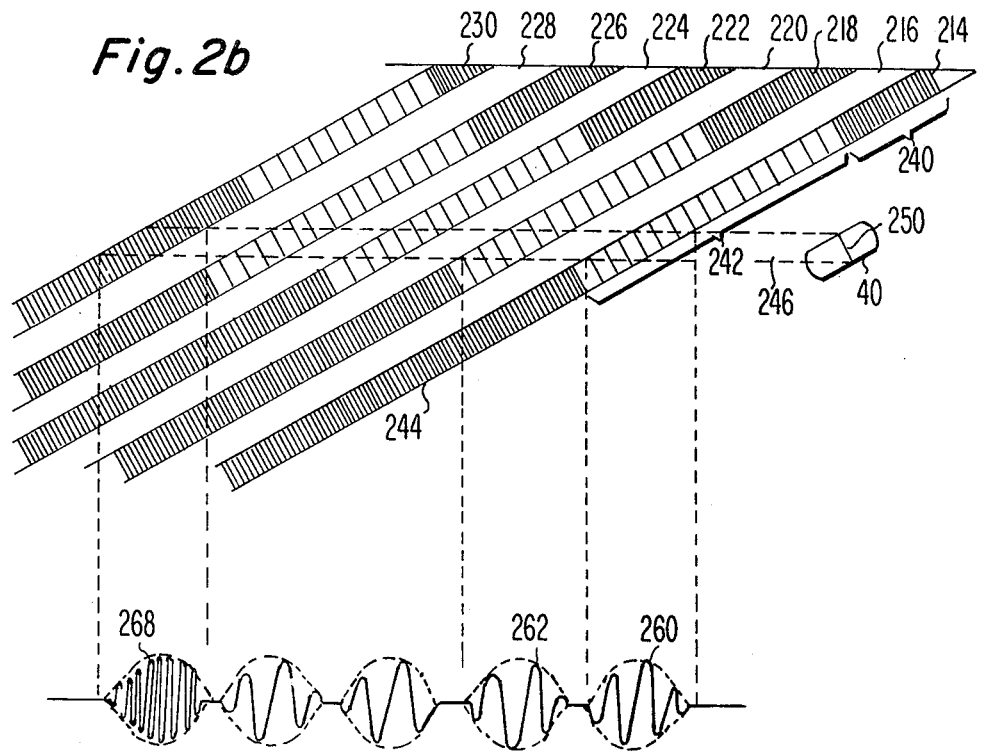
Fig.2b
Fig.2c
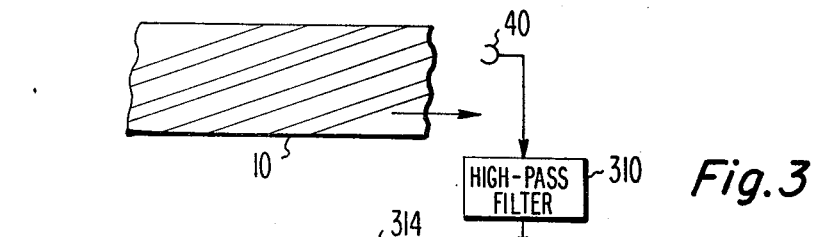
Fig.3
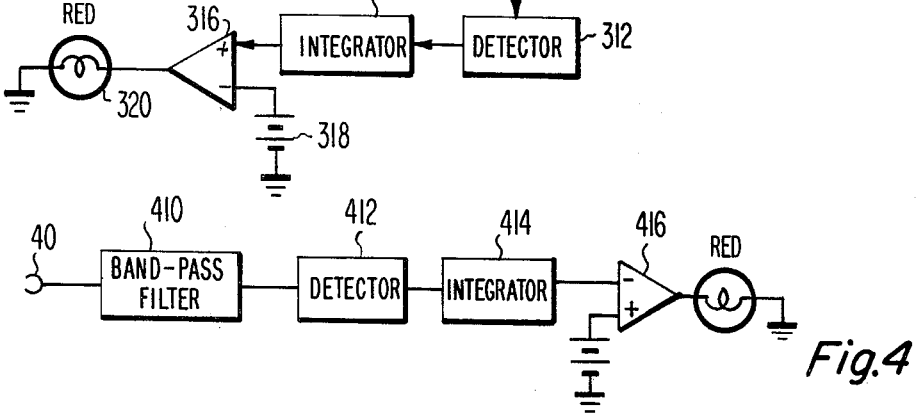
Fig.4

HEADWHEEL SERVO LOCK VERIFICATION WITH STATIONARY HEAD

BACKGROUND OF THE INVENTION

This invention relates to an arrangement whereby a stationary head located at a fixed position downstream of the headwheel of a helical-scan recorder may be used to verify correct locking of the headwheel servo.

In helical-scanned recorders, the high head-to-tape speeds necessary to achieve a significant magnetic wavelength on a tape so that high frequencies may be recorded is achieved by a rapidly rotated headwheel bearing one or more magnetic heads or transducers which scan the tape. While the headwheel rotates and the heads scan the tape at high speed, the tape moves slowly across the headwheel, whereby each scanning head traces an elongated path across the tape.

For the recording of television video, helical-scan recorders are ordinarily arranged so that the duration of one scan of a head across the tape corresponds to the duration of one vertical field. If the tape is arranged to contact the headwheel through a 180° rotation of the headwheel, two heads may be mounted 180° apart on the headwheel so that one head is always available and in contact with the tape for transducing signals thereto or therefrom. As one head leaves the tape, the other head begins at the next following scan. In practice, there is always some overlap of the information transduced by the heads, so that no video information is lost.

Due to stretching and imperfections in the tape, and also due to variations in the velocity of the headwheel, there may be transient distortions of the video signal transduced by the heads at the time of crossover between the heads. A common distortion of this sort is a step change in phase of the horizontal synchronizing signals of the new field relative to the phase of the horizontal synchronizing signals in the field being scanned by the head just leaving the tape. Other distortions may include dropouts and other amplitude errors. In order to reduce the visibility of the distortions occurring at the time of crossover from one head to another in helical scan systems, it is customary to lock the rotation of the headwheel to the vertical synchronizing signal by means of a servo loop in such a manner that the crossover between heads occurs in the vicinity of the vertical synchronizing signals. Thus, the distortions arising from the switching between heads is near the top or bottom of the screen, and lies in the overscan region where it cannot be seen by the viewer.

The aforementioned step change in phase which is one of the distortions arising from the switching between heads may cause a "tearing" of vertical lines near the top of the raster of a television display to which the signals are applied. This results from the difference in phase between the horizontal oscillator of the television display device and the horizontal synchronizing signals transduced from the tape recorder. As the horizontal phase-lock (AFPC) loop of the television receiver slews the horizontal oscillator towards the new phase, the distortion gradually disappears. The slewing of the horizontal oscillator to the new phase cannot be accomplished instantaneously, because of the time lag introduced by the loop filter. Typically, such a loop filter requires at least 10 horizontal lines in which to correct an average jump in phase which may result from switching of the heads. Thus, the "tearing" may occur for more than 10 lines at the top of the screen. By timing the rotation of the headwheel and heads so as to cause the switchover between heads in contact with the tape to occur just before, rather than after, the vertical blanking interval, the 19 horizontal line duration of the vertical blanking interval becomes available as a time in which the horizontal oscillator may slew towards the new phase without the effects of the improper phase being visible to the viewer. Thus, it is universal practice to switch the heads near the end of each field, just a few horizontal lines before the beginning of the vertical blanking interval.

The locking of the rotation of the headwheel so as to produce switching of the heads at the correct instant is accomplished by a servo loop including a phase comparator to which the vertical synchronizing signals are applied together with a signal indicative of the mechanical position of the rotary headwheel. This signal may be known variously as a "once-around" signal, "twice-around" signal or the like. The phase detector compares the time of occurrence of the vertical synchronizing signal with the time at which the headwheel is at a particular position and produces a control signal which is processed to bring the two times into coincidence. As is known, such phase-lock loops may for various reasons fail to lock the headwheel to the synchronizing signals at all, may lock the frequency of the headwheel to the frequency of the synchronizing signal but with a phase offset, or may lock at a submultiple of the synchronizing frequency.

Considering that news events typically occur but once, portable recorders used for recording video from cameras at the scene of a news event should provide indications of malfunctions so that corrective action may be taken so as not to lose possible valuable news recordings.

SUMMARY OF THE INVENTION

An arrangement for monitoring the synchronization of a headwheel servo loop of a recorder which is adapted for recording video signals onto a magnetic tape which passes along a path through the recorder. The video signals which are recorded include recurrent synchronizing signals by which the headwheel is synchronized. The arrangement includes a stationary head located downstream from the headwheel and at a point contiguous with the path which the tape may take for transducing the video signals from the tape. The stationary head is located at a transverse position on the path which the tape may take which corresponds to the position at which the synchronization signal appears when the head wheel is correctly synchronized. The arrangement further includes a control circuit coupled to the stationary head for responding to that portion of the video signals transduced from the stationary head which correspond to the recurrent synchronizing signal for generating a control signal indicative of the locking status.

DESCRIPTION OF THE DRAWING

FIGS. 3 and 4 are block diagrams of circuits suited for use in conjunction with a verification head.

DESCRIPTION OF THE INVENTION

Figure 1:
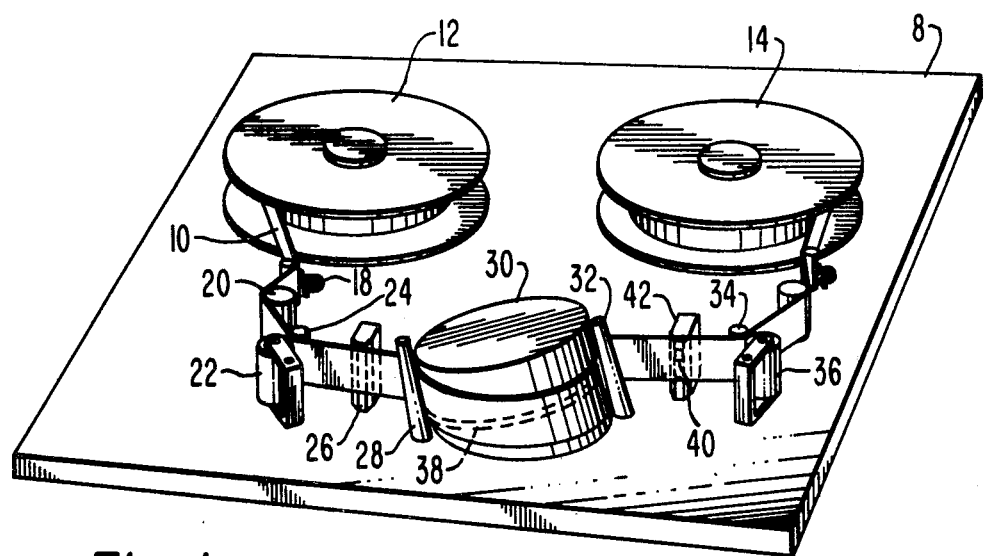
FIG. 1 illustrates a tape transport with a stationary head according to the invention.

FIG. 1 illustrates generally the tape transport system for a tape recorder. In FIG. 1, a baseplate 8 supports a supply reel 12 which supplies a web or tape 10 to a take-up reel 14. Tape 10 leaving reel 12 passes across a tensioning spring 18, a guidepost 20 and passes between a pinch roller 22 and a capstan 24. From capstan 24, the tape passes across an erase head 26 and is led onto a headwheel 30 by a guidepost 28. A post 32 guides the tape from headwheel 30 past a verification head 40 mounted on a fixed post 42 downstream from headwheel 30 and thence by means of a capstan 24 and a pinch roller 36 to the take-up reel. As tape 10 slowly passes across the surface of headwheel 30, headwheel 30 rotates rapidly, causing heads (not shown) to scan across the tape to form a succession of elongated paths or tracks across the tape, one of which is illustrated as 38 in FIG. 1.

Figure 2A:
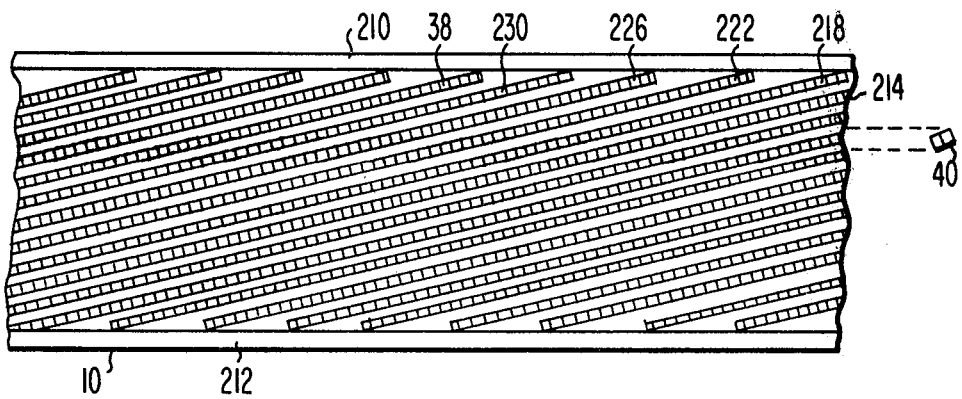
FIGS. 2 a-c illustrates a magnetic tape with tracks recorded by an arrangement such as that illustrated in FIG. 1, and also illustrates a fixed verification head positioned relative to the tape and also ilustrates typical signals transduced by the verification head.

FIG. 2a illustrates a portion of tape 10 after recording by an arrangement such as that illustrated in FIG. 1. At the top and bottom edges of tape 10 are spaces 210 and 212, respectively, which are not recorded by the scanning heads on headwheel 30, which are therefore available for the recording of audio tracks, cue tracks and the like. A portion of elongated track 38 is illustrated in FIG. 2a. Other recorded tracks are illustrated as 214, 218, 222, 226, and 230. As illustrated in FIG. 2b, guardband 216 is disposed between recorded tracks 214 and 218, and similarly guardbands 220, 224, and 228 are disposed between the other mentioned recorded tracks. The recorded tracks are illustrated conventionally, by lines perpendicular to the length of the track to denote the orientation of the gap by which the tracks were recorded. As illustrated in FIG. 2, the recording gap was perpendicular to the direction of head scanning. The convention as illustrated is reminiscent of the appearance of the tape when the magnetic patterns are examined visually, as by coating the recorded tape with carbonyl iron suspension and transferring the resulting pattern to transparent adhesive tape.

In order to reduce the distortion caused by variations in pressure of the tape against the heads, and other effects affecting the amplitude response of the tape recorder, it is customary to frequency-modulate the video signal to be recorded onto a high-frequency carrier which is recorded onto the tape, and which upon playback is applied to an FM demodulator. The FM demodulator includes an amplitude limiter which strips off any amplitude modulation which may have occurred in the recording process. The frequency modulated carrier is then demodulated to reproduce the video signal free of noise.

In standard NTSC television, the composite video signal includes luminance and chrominance components and also includes vertical and horizontal synchronizing signals. To allow the television receiver to recognize the synchronizing signals, the largest-amplitude portions of the composite video signal are allocated to the vertical and horizontal synchronizing signals. As a result, one frequency extreme of the deviation of the FM carrier in the video tape recorder represents the synchronizing signals. In the convention illustrated in FIG. 2b, the closely spaced lines indicate a region in which the frequency of the frequency-modulated signal is high, and the more widely spaced portions represent regions of the tape recorded by the FM carrier at a lower frequency.

According to a particular standard for video recorders, the lowest deviation frequency of the FM oscillator is assigned to the amplitude of the composite video corresponding to the vertical and horizontal synchronizing signals. The blanking levels also have a low frequency. The horizontal synchronizing and blanking signals are of short duration and do not show up in FIG. 2b. The vertical blanking interval, however, has a duration of 19 horizontal lines, and is easily visible to the scale shown in FIG. 2b.

When the headwheel servo locks the headwheel so that the crossover between heads occurs a few horizontal lines before the beginning of the vertical blanking interval, as described previously, the low-frequency recorded portion corresponding to the vertical blanking interval will occur at approximately the same position on the tape on each successive scan. As illustrated in FIG. 2b, scanning begins at upper right and proceeds towards lower left. Consequently, the first few lines of each track contain principally high-frequency components, as illustrated by portion 240 of track 214, representing video together with a low duty-cycle horizontal synchronizing pulse. The next portion extends over 19 horizontal lines and contains low frequencies, as illustrated by portion 242 of track 214. The portion of each track following the vertical blanking interval contains mostly high frequency components, again representing a combination of video and horizontal synchronizing pulses, as illustrated by portion 244 of track 214.

With the headwheel servo locked, the lowest-frequency portion of each track occurs at the same time after the beginning of each track and therefore appears in a region which is at a particular predetermined distance from the edge of the tape. A fixed head such as 40 of FIG. 1 located at that particular fixed distance from the edge of the tape and downstream from the recording location will scan in succession across that portion of each recorded track in which the vertical blanking interval occurs, as illustrated in FIG. 2b. In FIG. 2b, the track 246 scanned by a gap 250 in head 40 can be seen to pass through the low-frequency portions of recorded tracks 214-226. Gap 250 is canted at an angle which corresponds with the aximuth angle at which the tracks were recorded in order to provide maximum amplitude response to the magnetic signals. As gap 250 scans across track 214, head 40 responds to the low-frequency signals recorded in portion 242 of track 214, and produces a pulse of relatively low-frequency signal illustrated as 260 in FIG. 2c. As head 40 continues to scan across the tape, the signal transduced by head 40 decreases as gap 250 crosses guardband 216. As head 40 passes over track 218, another pulse of low-frequency energy illustrated as 262 in FIG. 2c is transduced. Thus, the scanning of head 40 across a succession of tracks 214-226 which were recorded with a properly locked headwheel will result in a succession of pulses of low-frequency signals.

The frequency response of head 40 and of the associated electronics may be much lower than the frequency of the heads by which the video is recorded and played back, because of the relative speed with which head 40 scans across the recorded tracks. Thus, in a conventional video recorder the headwheel rotates with a velocity which causes the recording heads to scan the tape at approximately 1000 inches/second (25.4 meters/sec) but the tape advances across the headwheel at only 10 inches per second (25.4 cm/sec). If, for example, the lowest recording frequency (corresponding to the synchronizing signal tip) is 7 MHz and the highest frequency (corresponding to white level) is 10 MHz, the magnetic wavelength of the lowest frequency portion of the recorded track will be $0.14 \times 10^{-3}$ inches ($3.5 \times 10^{-6}$ meters). This wavelength, when scanned across verification head 40 at a rate of 10 inches per second will produce a signal at 70 kilohertz. Thus, it can be seen that the reduction in frequency between the actual recording frequency by a recording head on the headwheel and the frequency transduced by a fixed verification head will differ by the ratio of the tape-to-head speeds.

The difference in frequency response between the recording heads and the verification playback head is a significant advantage. The isolation between the playback head and the recording heads is in part dependent upon their frequency response. When the heads and circuits associated with a playback head are in the same frequency range as that of the recording heads, the coupling at a particular distance will be greater than if they respond to disparate frequencies.

If headwheel 30 is locked, but has a phase offset, the recorded track may have the form of track 230 of FIG. 2b. As illustrated, track 230 begins just at the beginning of vertical blanking. Thus, switchover of the tape heads is several lines late. As a result, that portion of track 230 which represents the vertical blanking interval occurs physically higher or closer to the edge of the tape than do the corresponding portions of properly recorded tracks 214–226. Consequently, path 246 representing the scanning path of gap 250 across the tape fails to intersect the lowest frequency portions of track 230. As a result, when head 40 scans across track 230, a pulse illustrated as 268 of high-frequency signal is transduced by head 40. The differences in the response of head 40 to properly and improperly recorded tracks can be used to provide an indication of proper or improper headwheel locking.

FIG. 3 illustrates an arrangement for using the transduced signal to provide an indication of faulty headwheel locking. In FIG. 3, tape 10 scans across a head 40 as described previously. Head 40 is at a similar transverse position relative to tape 10 as illustrated in FIG. 2b. Consequently, when the headwheel is properly locked, head 40 transduces a succession of pulses of relatively low-frequency signals. Head 40 is coupled to a highpass filter 310 which will not pass the low-frequency signal, but which will pass a signal of a higher frequency. So long as the headwheel remains properly locked, no signal passes through filter 310. If the headwheel becomes improperly locked, head 40 will transduce high-frequency components, as described previously. These components will pass through high-pass filter 310 to a detector 312 for detection. An integrator 314 is coupled to detector 312 for integrating the detected signal over a period of time sufficient to discriminate against transient noise. The output of integrator 314 is applied to the noninverting input terminal of a comparator 316. A reference voltage illustrated as a battery 318 is coupled to the inverting input of comparator 316. Comparator 316 compares the integrated high-frequency signal with the reference voltage and produces an output signal when the high-frequency components reach the reference level to light a red warning indicator 320, thereby warning the operator of a headwheel servo malfunction.

Another embodiment of the invention is illustrated in FIG. 4. In FIG. 4, head 40 transduces signals in the same manner as described previously. A bandpass filter 410 is coupled to the output of head 40 for passing a band of frequencies including the frequencies corresponding to the vertical synchronizing and blanking levels. When the headwheel is properly locked, the bandpass filter couples pulses such as 260 of low-frequency signal to a detector 412 and an integrator 414 corresponding to those of FIG. 3. The integrator output is applied to the inverting terminal of a comparator 416 so that the output of comparator 416 is inhibited so long as low-frequency pulses are transduced by head 40.

When the headwheel is completely unsynchronized, each successive track will in general be at a different relative position, and the low-frequency portions corresponding to the vertical synchronizing and blanking intervals will correspond in position to the position of verification head 40 on a random basis. Since the vertical blanking interval has a duration of 19 horizontal lines in each field of approximately 250 lines, the proportion of the time in which low-frequency signals are transduced is small compared with the time in which high-frequency signals are transduced. As a result, when the transduced signals are detected and integrated, the low-frequency portions have little effect and an improper lock condition is sensed.

A head such as head 40 may be positioned so as to provide verification of headwheel locking when used in conjunction with a filter circuit as described. This same head may simultaneously be used to provide an indication of recording or nonrecording by use of a separate unfiltered detector circuit, as described in U.S. patent application Ser. No. 082,468 entitled "Verification of Video Recording With Stationary Heads" filed Oct. 9, 1979 in the name of H. R. Warren.

Other embodiments of the invention will be obvious to those skilled in the art. For example, the filters may have a narrow bandwidth and be centered on the frequencies representing the synchronizing signal levels so as to respond to the synchronizing signals to the exclusion of the blanking-level signals. This will allow more accurate sensing of the accuracy of headwheel servo locking. However, the vertical synchronizing signal is three horizontal lines long, so a certain amount of headwheel servo error might still not be identified by this arrangement. More than one stationary verification head may be used, each arranged to sense a particular identifiable portion of the recorded signal so as to further reduce the identifiable range of error. It wll also be apparent that the incorrect locking indication signal may be used as an input to the headwheel servo loop to aid in accomplishing correct lock.

What is claimed is:

1. An arrangement for monitoring the synchronization of a headwheel servo loop of a recorder adapted for recording video signals onto magnetic tape which passes along a path through said recorder, said video signals including recurrent synchronizing signals by which said headwheel is synchronized, comprising:

stationary head means located downstream from said headwheel and contiguous with said path for transducing said video signals, said stationary head means further being located at a transverse position on said path corresponding to a unique position taken by said synchronization signal when said headwheel is correctly synchronized; and sensing means coupled to said stationary head for responding differentially to that portion of said video signals corresponding to said synchronizing signal and to the remainder of said video signals for generating a control signal indicative of servo loop locking status.

2. An arrangement according to claim 1, wherein said stationary head means is located at a transverse position on said path at which a vertical blanking signal occurs.

3. An arrangement according to claim 1, wherein said video signals are frequency-modulated, and said sensing means further comprises filter means responsive to those frequency components of said video signals corresponding to said synchronizing signals.

4. An arrangement according to claim 3, wherein said sensing means further comprising integrating means coupled to said filter means for integrating those signals corresponding to said synchronizing signals to which said filter means is responsive.

5. An arrangement according to claims 1 or 4, further comprising indicator means coupled to said sensing means and responsive to said control signal for indicating a fault.

6. An arrangement for monitoring the synchronization of a headwheel servo loop of a recorder adapted for recording video signals onto magnetic tape which passes along a path through said recorder, said video signals including recurrent signals occurring at a fixed recurrent relative time in each vertical scan; comprising:

stationary head means located downstream from said headwheel and contiguous with said path for transducing said video signals, said stationary head means further being located at a unique transverse position on said path corresponding to the position taken by said recurrent signals when said headwheel is correctly synchronized; and sensing means coupled to said stationary head for responding differentially to that portion of said video signals corresponding to said recurrent signals and to the remainder of said video signals for generating a control signal indicative of the locking status of said headwheel.

* * * * *